United States Patent
Barer et al.

(10) Patent No.: US 12,262,197 B2
(45) Date of Patent: Mar. 25, 2025

(54) SENDER VERIFICATION FOR ENCRYPTED ELECTRONIC MESSAGING

(71) Applicant: Apple Inc., Cupertino, CA (US)

(72) Inventors: Elliot A. Barer, Santa Clara, CA (US); Pierre J. Defilippis, San Jose, CA (US); Roberto Garcia, Santa Clara, CA (US); Timothy Shaw, Cupertino, CA (US); Craig M. Federighi, Cupertino, CA (US); Darin B. Adler, Cupertino, CA (US); Jonathon Sodos, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 105 days.

(21) Appl. No.: 17/316,664

(22) Filed: May 10, 2021

(65) Prior Publication Data
US 2021/0352470 A1  Nov. 11, 2021

Related U.S. Application Data

(60) Provisional application No. 63/023,134, filed on May 11, 2020.

(51) Int. Cl.
*H04W 12/033* (2021.01)
*H04W 4/14* (2009.01)
*H04W 12/69* (2021.01)

(52) U.S. Cl.
CPC ......... *H04W 12/033* (2021.01); *H04W 12/69* (2021.01); *H04W 4/14* (2013.01)

(58) Field of Classification Search
CPC ..... H04W 12/033; H04W 12/69; H04W 4/14; H04W 12/06; H04W 12/062;
(Continued)

(56) References Cited

U.S. PATENT DOCUMENTS 7,219,223 B1 * 5/2007 Bacchus ............... H04L 63/205
                                                       713/150
7,607,022 B1 * 10/2009 Qiu .................... H04N 21/2347
                                                       725/31
(Continued)

FOREIGN PATENT DOCUMENTS

CA    2757495 A1 * 10/2009 ............. H04W 12/12
CA    2893764 A1 * 12/2015 ........... G06F 16/955

OTHER PUBLICATIONS

De Santis, Alfredo, et al. "An extensible framework for efficient secure SMS." 2010 International Conference on Complex, Intelligent and Software Intensive Systems. IEEE, 2010. (Year: 2010).*

(Continued)

*Primary Examiner* — Sharad Rampuria
(74) *Attorney, Agent, or Firm* — BAKERHOSTETLER (57) ABSTRACT

The subject disclosure provides systems and methods for sender verification for encrypted electronic messaging. The discloses systems and methods may facilitate reducing or preventing spam messages between electronic devices. An electronic device may determine, prior to sending an electronic message to another device with a first level of encryption that is higher than a second level of encryption, whether the electronic device is eligible to send the message with the first level of encryption. If an electronic device determines that it is ineligible to send the message with the first level of encryption to another electronic device, a first message from the electronic device to the other electronic device may be sent with the second level of encryption as part of an unencrypted or low encryption handshake between the devices.

20 Claims, 6 Drawing Sheets

(58) Field of Classification Search
CPC ............. H04W 12/065; H04W 12/068; H04W 12/069; H04W 12/08; H04W 12/082; H04W 12/084; H04W 12/086; H04W 12/088; H04W 12/12; H04W 12/121; H04W 12/122; H04W 12/125; H04W 12/126; H04W 12/128; H04W 88/02; H04L 9/14; H04L 9/3215; H04L 51/212; H04L 51/58; H04L 63/18; H04L 2209/80; H04L 63/105; H04L 9/088; H04L 63/0428; H04L 63/08
See application file for complete search history.

(56) References Cited

U.S. PATENT DOCUMENTS

| | | | | |
|---|---|---|---|---|
| 8,582,760 | B2* | 11/2013 | Rosati | H04L 63/0442 |
| | | | | 713/168 |
| 9,032,498 | B1* | 5/2015 | Ben Ayed | G06F 21/35 |
| | | | | 726/9 |
| 9,413,766 | B2* | 8/2016 | Larson | H04L 61/5076 |
| 9,473,534 | B2* | 10/2016 | Brander | H04L 63/0435 |
| 2007/0028098 | A1 | 2/2007 | Baartman et al. | |
| 2007/0254683 | A1* | 11/2007 | Jie | H04L 51/212 |
| | | | | 455/466 |
| 2008/0059789 | A1* | 3/2008 | Lucidarme | H04L 63/205 |
| | | | | 713/153 |
| 2012/0039470 | A1* | 2/2012 | Veugen | H04L 63/101 |
| | | | | 380/255 |
| 2012/0100839 | A1* | 4/2012 | Christensen | H04M 3/42034 |
| | | | | 455/415 |
| 2014/0128047 | A1* | 5/2014 | Edwards | H04L 51/212 |
| | | | | 455/415 |
| 2014/0274171 | A1* | 9/2014 | Cooper | H04W 4/12 |
| | | | | 455/466 |
| 2014/0295899 | A1* | 10/2014 | Merrett | H04L 69/24 |
| | | | | 455/466 |
| 2015/0044994 | A1* | 2/2015 | Kumoluyi | H04W 12/04 |
| | | | | 455/410 |
| 2015/0350250 | A1* | 12/2015 | Brander | H04W 12/04 |
| | | | | 726/1 |
| 2016/0057115 | A1* | 2/2016 | Abuelsaad | G06F 21/606 |
| | | | | 713/152 |
| 2018/0063096 | A1* | 3/2018 | Rogson | H04L 63/105 |
| 2018/0160292 | A1* | 6/2018 | Chastain | H04W 4/50 |
| 2021/0289069 | A1* | 9/2021 | Moshir | H04W 4/12 |

OTHER PUBLICATIONS

Chavan, Rashmi Ramesh, and Manoj Sabnees. "Secured mobile messaging." 2012 International Conference on Computing, Electronics and Electrical Technologies (ICCEET). IEEE, 2012. (Year: 2012).*

Mayrhofer, Rene, and Hans Gellersen. "Shake well before use: Intuitive and secure pairing of mobile devices." IEEE Transactions on Mobile Computing 8.6 (2009): 792-806. (Year: 2009).*

Peter, Steffen, Dirk Westhoff, and Claude Castelluccia. "A survey on the encryption of convergecast traffic with in-network processing." IEEE Transactions on Dependable and Secure Computing 7.1 (2008): 20-34 (Year: 2008).*

Said, Amir. "Measuring the strength of partial encryption schemes." IEEE International Conference on Image Processing 2005. vol. 2. IEEE, 2005. (Year: 2005).*

International Search Report and Written Opinion from PCT/US2021/031603, dated Jul. 14, 2021, 13 pages.

European Office Action from European Patent Application No. 21729383.6, dated Aug. 10, 2023, 8 pages.

Chinese Office Action from Chinese Patent Application No. 202180034376.2, dated Apr. 26, 2024, 10 pages including English language translation.

* cited by examiner

SENDER VERIFICATION FOR ENCRYPTED ELECTRONIC MESSAGING

CROSS REFERENCE TO RELATED APPLICATIONS

This application claims the benefit of priority to U.S. Provisional Patent Application No. 63/023,134, entitled "SENDER VERIFICATION FOR ENCRYPTED ELECTRONIC MESSAGING," filed on May 11, 2020, the disclosure of which is hereby incorporated herein in its entirety.

TECHNICAL FIELD

The present description relates generally to electronic messaging.

BACKGROUND

Electronic messages are often exchanged between electronic devices through Short Message Service (SMS) servers over cellular communications networks. Electronic messages sent in this way are typically referred to as SMS messages. In addition, messaging systems that are separate from the SMS servers can also allow exchange of electronic messages between electronic devices. These messaging systems can include service provider systems that manage the exchange of messages between electronic devices over the cellular communications networks and/or over other networks such as over the Internet. Although SMS messaging systems and other messaging systems provide a service to users, these systems can also be exploited for sending unwanted and/or unsolicited messages, often referred to as "spam", in bulk, to many electronic devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In electronic messaging, the subject technology provides for a first message from a sender device to a recipient device to be sent unencrypted (or with a relatively low level of encryption) so that the first message can be analyzed by network servers to determine whether the first message is a spam message, in certain predefined circumstances as discussed in further detail herein. If the first message is delivered to the recipient device, and a response from the recipient device is received at the sender device, a next message can be sent by the sender device to the recipient device with a relatively higher level of encryption. In this way, the subject technology can facilitate a reduction or prevention of unwanted and/or unsolicited spam messages being delivered over various networks to an electronic device, by preventing sending of an encrypted message (which can circumvent spam filtering at the network servers) as a first message from a particular sender device to a particular recipient device.

In one or more implementations, a first device determines whether the first device is eligible to send a message to a second device with a first strength of encryption that is higher than a second strength of encryption, based on (1) an identifier of the first device or (2) an identifier of the second device.

Figure 1:
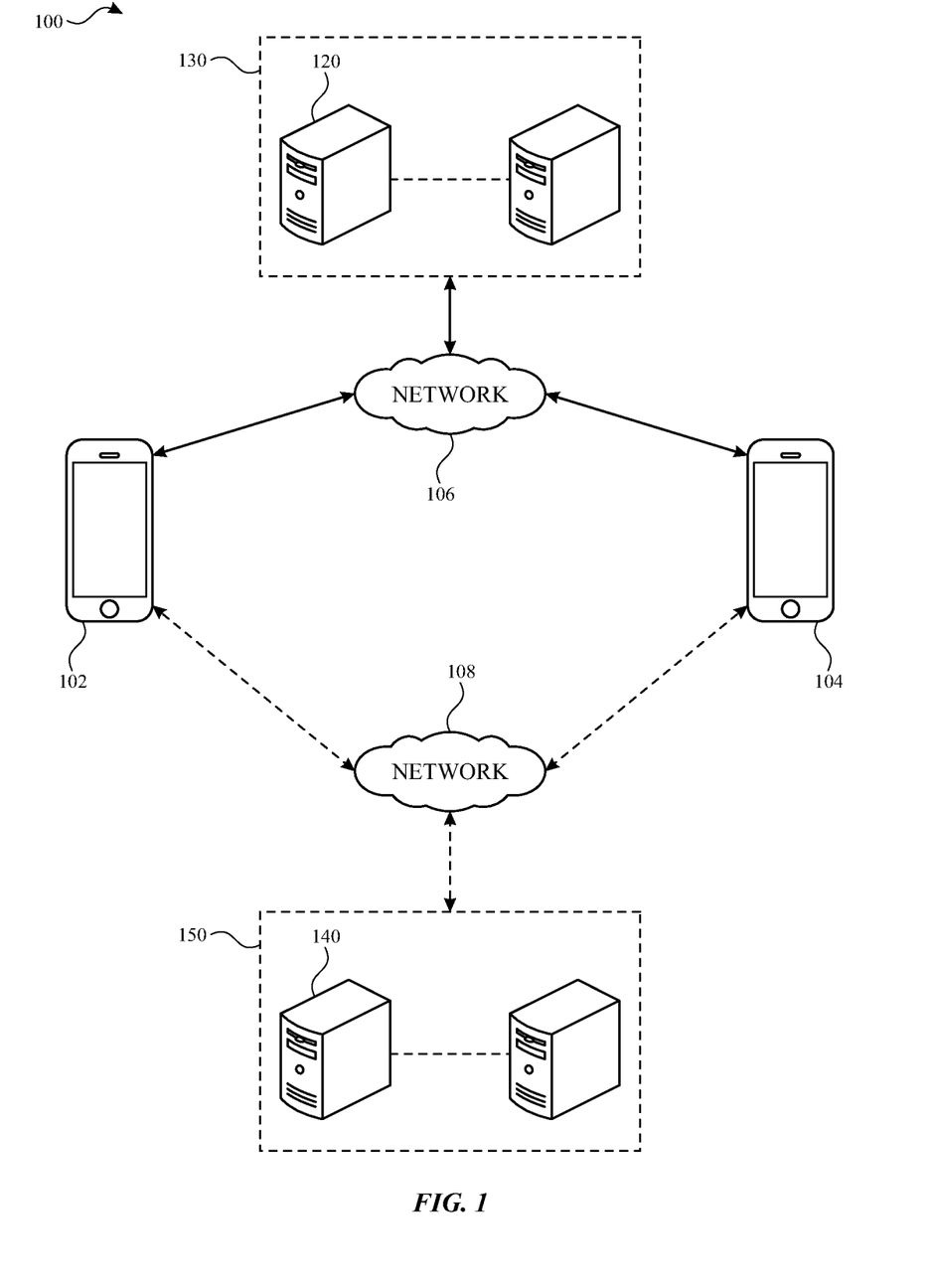
FIG. 1 illustrates an example network environment for electronic messaging in accordance with one or more implementations.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104, a first network 106, one or more servers 120 communicatively coupled to the first network 106, a second network 108, and one or more servers 140 communicatively coupled to the second network 108. The first network, 106 may, for example, be a cellular communications network that includes one or more base transceivers at fixed locations in each of several geographic "cells", the base transceivers communicating wirelessly with end devices such as electronic devices 102 and 104, and via wired and/or satellite communications with various switched networks for voice calls and text messages, mobile data, and public telephony.

The second network 108 may be or include, for example, a public network such as the Internet. The second network 108 may include local area network (LAN) components, such as Wi-Fi routers and/or Ethernet connections that are local to each of electronic devices 102 and 104, that couple the corresponding electronic device to the wider Internet. A LAN that connects electronic device 102 or 104 to the Internet may include one or more different network devices/network mediums and/or may utilize one or more different wireless and/or wired network technologies, such as Ethernet, optical, Wi-Fi, Bluetooth, Zigbee, Powerline over Ethernet, coaxial, Z-Wave, generally any wireless and/or wired network technology that may communicatively couple an electronic device to the Internet.

As shown, servers 120 may be one or more servers, and/or one or more other cellular network elements, of a short-message-service (SMS) 130 that manage the exchange of SMS and/or MMS messages over the first network 106. For example, the servers 120 may be, and/or may include all or part of, an SMS center, an SMS gateway, and/or an MMS gateway. As shown, servers 140 may be one or more servers of a service provider 150 that manages the exchange of electronic messages, such as over the second network 108. The dashed arrowed lines in FIG. 1 indicate message paths over which messages may be transmitted having a first level of encryption, such as unencrypted messages (e.g., SMS or MMS messages), that is less than a second level of encryption of messages transmitted over the message paths indicated by the solid arrowed lines in FIG. 1. As indicated in FIG. 1, messages having the first level of encryption may be sent over the first network 106 via servers 120. As indicated in FIG. 1, messages having the second level of encryption may be sent (e.g., over the second network 108), using servers 140. However, it should be appreciated the exchanges of messages having various levels of encryption depicted in FIG. 1 are merely illustrative and that other exchanges of messages may occur.

Figure 2:
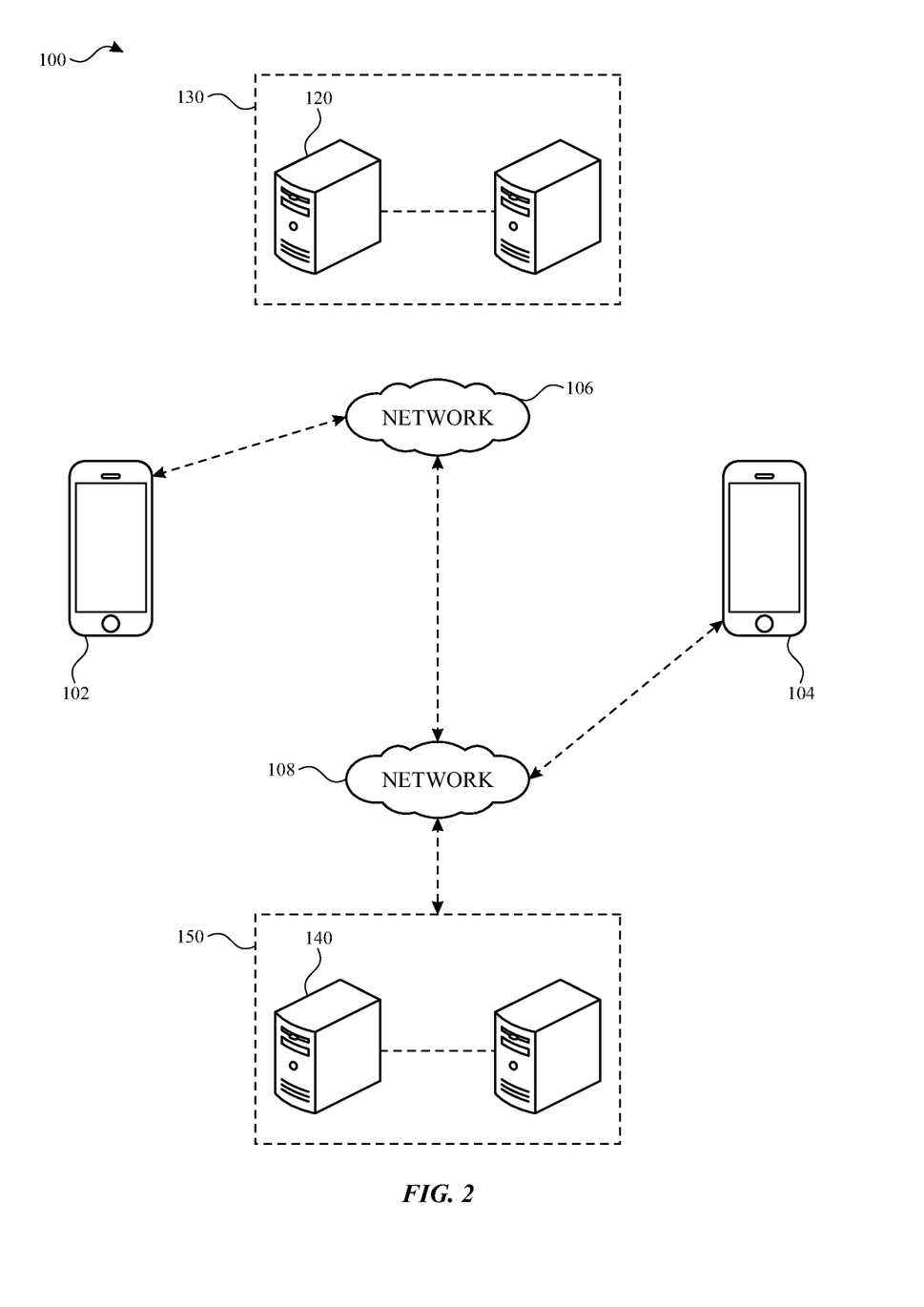
FIG. 2 illustrates additional aspects of electronic messaging using the example network environment of FIG. 1 in accordance with one or more implementations.

For example, FIG. 2 illustrates that encrypted messages having the second (e.g., higher) level of encryption (indicated by dashed arrowed lines in FIG. 2) can also be exchanged using the first network 106. In the example of FIG. 2, electronic device 102 no longer has a direct connection to the second network 108, but can exchange encrypted messages, via servers 140, with electronic device 104 by sending the encrypted messages to the second network 108 via the first network 106. For example, the encrypted messages from electronic device 102 can be sent over a portion of a cellular data network to second network 108, without passing through servers 120. For example, the encrypted messages may pass through a portion of the first network 106, such as a packet switched network of the first network 106 that provides a cellular data connection. The packet switched network may be a separate channel from an SMS channel of the first network 106 (e.g., a core circuit switched network of the first network 106 that allows SMS texts to be sent without a data connection). Similarly, when both of the electronic devices 102, 104 have a connection to the first network 106, the electronic devices 102, 104 can communicate encrypted messages over the portion of the cellular data network without passing through the servers 120 and without passing through the second network 108.

One or more of the electronic devices 102 and 104 may be, for example, a portable computing device such as a laptop computer, a smartphone, a smart speaker, a peripheral device (e.g., a digital camera, headphones), a digital media player, a tablet device, a wearable device such as a smartwatch or a band, or any other appropriate device that includes and/or is communicatively coupled to, for example, one or more wired or wireless interfaces, such as Wi-Fi communications circuitry, cellular communications circuitry, Bluetooth communications circuitry, Zigbee communications circuitry, near field communication (NFC) communications circuitry, and/or other wired or wireless communications circuitry, and is provided with software and/or hardware for sending and receiving electronic messages.

By way of example, in FIG. 1 each of the electronic devices 102 and 104 is depicted as a smart phone. In one or more implementations, one or more of the electronic devices 102 and 104 may be a smart television, a laptop or a mobile device, such as a smart phone or a smart watch. In one or more implementations, one or more of the electronic devices 102 and 104 may be integrated into its corresponding display device. One or more of the electronic devices 102 and 104 may be, and/or may include all or part of, the electronic system discussed below with respect to FIG. 8.

The electronic devices 102 and 104 may include a processor, a memory, a communication interface, and/or other electronic components. The processor may include suitable logic, circuitry, and/or code that enable processing data and/or controlling operations of the device. In this regard, the processor may be enabled to provide control signals to various other components of the device. The processor may also control transfers of data between various portions of the device. Additionally, the processor may enable implementation of an operating system or otherwise execute code to manage operations of the device. The memory may include suitable logic, circuitry, and/or code that enable storage of various types of information such as received data, generated data, code, and/or configuration information. The memory may include, for example, random access memory (RAM), read-only memory (ROM), flash, and/or magnetic storage. In one or more implementations, one or more of the processor, the memory, the communication interface, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

One or more of the servers 120 or 140 may be, and/or may include all or part of the electronic system discussed below with respect to FIG. 8. Each of the servers 120 and 140 may include one or more servers, such as a cloud of servers. For explanatory purposes, two servers are shown and discussed with respect to various operations for each of the short message service 130 (e.g., as provided by a mobile network operator), and the service provider 150. However, these and other operations discussed herein may be performed by one or more servers, and each different operation may be performed by the same or different servers.

For explanatory purposes, the network environment 100 is illustrated in FIGS. 1 and 2 as including electronic devices 102 and 104, and the servers 120 and 140; however, the network environment 100 may include any number of electronic devices and any number of servers.

Figure 3:
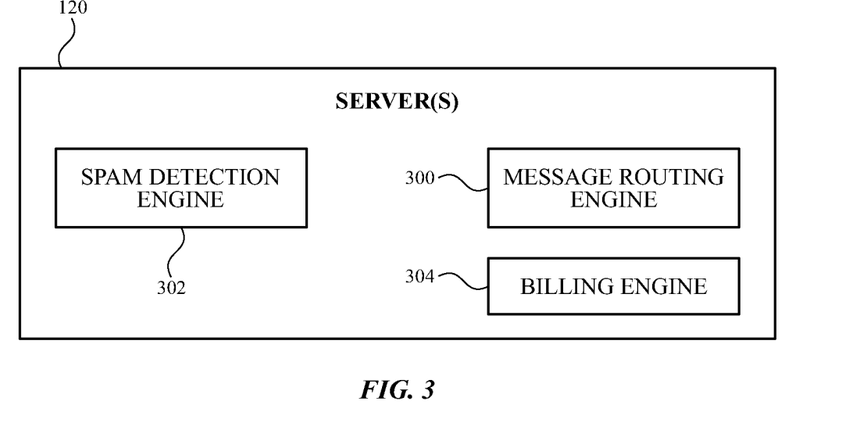
FIG. 3 illustrates a block diagram of an example cellular network server in accordance with one or more implementations.

FIG. 3 illustrates various aspects of a server 120 of the short message service 130 (e.g., an SMS server) in accordance with one or more implementations. As shown in FIG. 3, an SMS server such as one or more of servers 120 may include a message routing engine 300 that routes messages, such as messages having a level of encryption that is lower than a level of encryption of messages that are routed through servers 140, between electronic devices such as electronic devices 102 and 104 of FIGS. 1 and 2. For example, message routing engine 300 may route messages to a particular electronic device using a phone number that is associated with that device, and that is included with the message when the message is received at the server 120. As illustrated, server 120 may also include or be associated with a billing engine 304. Billing engine 304 may be associated with SMS 130 and/or with a carrier that provides the first network 106, and may accumulate charges (e.g., per-message charges and/or data-based charges) to a cellular network account holder that sends and/or receives the messages that are routed by message routing engine 300.

As shown in FIG. 3, servers 120 may include or be associated with a spam detection engine 302. Spam detection engine 302 may perform spam detection operations using the content of the messages received at server 120, to flag and/or prevent transmission of spam messages through the server 120. For example, spam detection engine 302 may analyze the content and/or metadata of a message received at server 120 and flag the message spam based on, for example, a length of the content, a number of messages sent by a particular sending device to different receiving devices over a given period of time, a number of messages with similar or the same content transmitted by a particular sending device over a given period of time, a number or fraction of capital letters in the content, a link in the content, and/or certain terms such as terms deemed to be aggressive, promotional, profane, etc. In circumstances in which spam detection engine 302 flags a message as a spam message, message routing engine 300 may transmit the message with the spam flag to a recipient device, or may prevent transmission of the flagged message to the recipient device.

Figure 4:
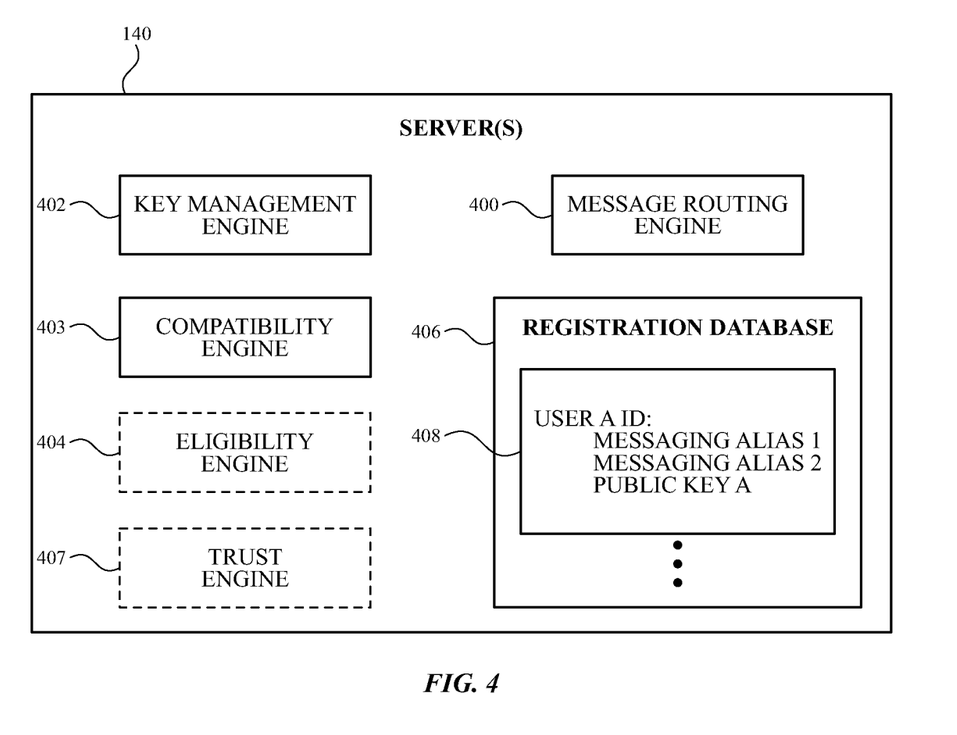
FIG. 4 illustrates a block diagram of an example service provider server in accordance with one or more implementations.

FIG. 4 illustrates various aspects of a server 140 of the service provider 150 (e.g., a service provider server) in accordance with one or more implementations. As shown in FIG. 4, a service provider server may include a registration database 406 in which account information 408 for various users of the service provider 150 can be stored. In the example of FIG. 4, for each of several users, registration database 406 stores a user identifier (e.g., "USER A ID"), and one or more messaging aliases corresponding to that user identifier. In the example of FIG. 4, account information 408 for the user associated with user identifier USER A ID includes two messaging aliases. For example, MESSAGING ALIAS 1 may be a phone number of the user identified by USER A ID, and MESSAGING ALIAS 2 may be an email address of the user identified by USER A ID. In one or more implementations, the account information 408 for each user may include identifiers of one or more electronic devices that are associated with one or more of the messaging aliases.

As shown in FIG. 4, a service provider server such as server 140 may also include a message routing engine 400 that routes messages, such as messages having a level of encryption that is higher than a level of encryption of messages that are routed through servers 120, between electronic devices such as electronic devices 102 and 104 of FIGS. 1 and 2. For example, message routing engine 400 may route messages to a particular electronic device using one or more of the messaging aliases that are associated with a user identifier in account information 408 for that user. In circumstances in which registration database 406 stores identifiers of multiple electronic devices associated with a user identifier and/or one or more aliases associated with that user identifier, message routing engine 400 may route an incoming messages from a first device (e.g., encrypted messages from a sender device) to multiple devices that are associated with that user identifier and/or corresponding aliases.

As shown, server 140 may also include a key management engine 402 that manages encryption keys to facilitate end-to-end encryption of messages sent from a first device to a second device through server 140. In this way, messages can be routed by message routing engine 400 without providing access, by server 140 and/or any other intervening parties, to the content of the messages. Key management engine 402 may, for example, provide public keys (e.g., public keys stored in account information 408) for message recipient devices to sender devices for encryption of messages, and/or public keys (e.g., stored in account information 408) of sender devices to recipient devices for decryption of encrypted messages.

As shown in FIG. 4, server 140 may also include a compatibility engine 403. Compatibility engine 403 may determine (e.g., during composition of a message at a sender device such as electronic device 102 prior to sending of a message), whether an intended recipient device such as electronic device 104 is capable of receiving a message with the first level of encryption (e.g., via server 140). Determining whether a recipient device is capable of receiving a message with the first level of encryption may include determining whether the recipient device is compatible with key management engine 402 (e.g., for exchanging information for decrypting an encrypted message), and/or determining whether an identifier of the recipient device is stored in registration database 406 in association with account information 408 for one or more users of server 140.

Determining (e.g., with compatibility engine 403) whether a recipient device is capable of receiving a message with the first level of encryption (e.g., via server 140) may be performed before and/or during a separate determination (e.g., at the sender device) of whether the sender device is eligible to send the message with the first level of encryption.

As shown in FIG. 4, server 140 may optionally include an eligibility engine 404 and/or a trust engine 407 that can be configured to perform some or all of the eligibility and/or trust scoring operations, respectively, that are described in further detail hereinafter in connection with FIG. 4, in one or more implementations.

Figure 5:
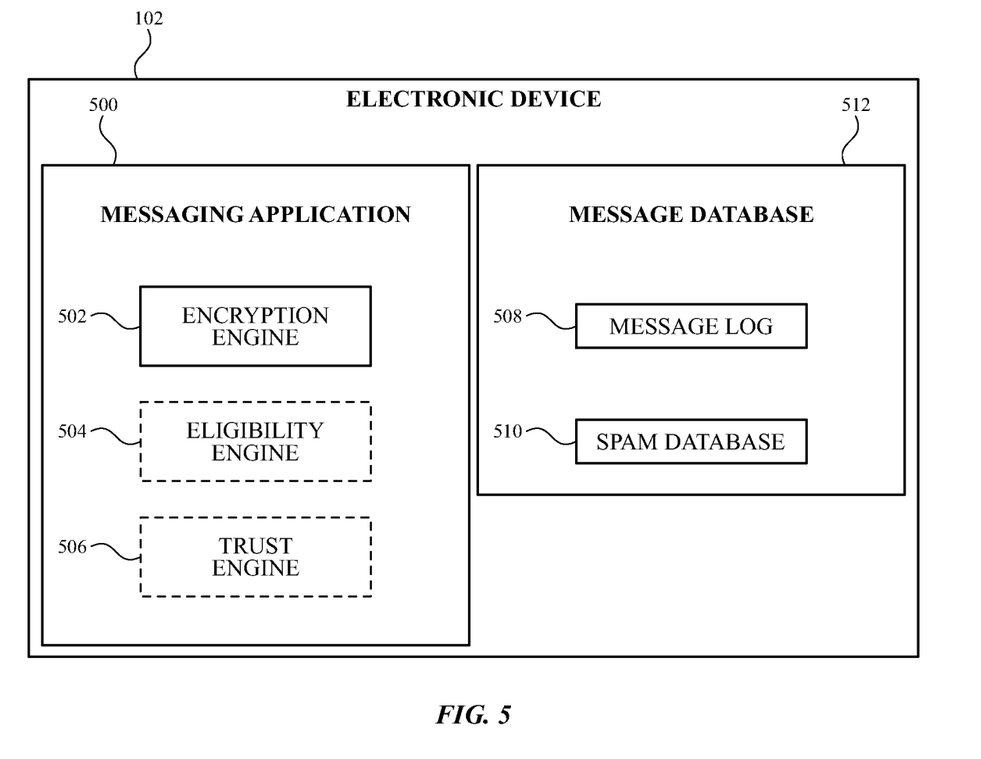
FIG. 5 illustrates a block diagram of an example electronic device in accordance with one or more implementations.

FIG. 5 illustrates various aspects of electronic device 102 (e.g., which can be operated as a sender device and/or a recipient device for electronic messages) in accordance with one or more implementations. As shown in FIG. 5, electronic device 102 may include a messaging application 500. Messaging application 500 may include a user interface that provides a user with tools for composing, sending, and receiving electronic messages. The user interface of messaging application 500 may include an input field into which a user can provide typed input, handwritten electronic input, image input, video input, etc. into an electronic message. The user interface may also include a "To" field into which a user can input an identifier of an intended recipient of a message. For example, the user can input or link to a telephone number, an email address, or another identifier (e.g., a messaging alias) of an intended recipient and/or an intended recipient device for the electronic message.

As shown in FIG. 5, messaging application 500 may include or be associated with an encryption engine 502 for encrypting messages prior to sending (e.g., with one or more levels or strengths of encryption). For example, to encrypt a message prior to sending, encryption engine 502 may request (e.g., from key management engine 402 of server 140), a public key (e.g., PUBLIC KEY A in the example of FIG. 4) associated with a recipient and/or recipient device. Encryption engine 502 may then encrypt the message content to be sent using at least the received public key and/or other information (e.g., using a symmetric encryption process such as an advanced encryption system (AES) encryption process, an asymmetric encryption process such as a Rivest-Shamir-Adleman (RSA) encryption process, or an encryption process that combines aspects of symmetric, asymmetric, AES, RSA, and/or other encryption processes). In circumstances in which electronic device 102 receives an encrypted message (e.g., via servers 140), encryption engine 502 may decrypt the encrypted message for display to the user (e.g., by using at least the private key corresponding to the public key of the electronic device 102, by sending a query corresponding to the encrypted message that was transmitted using an account alias of the sender, to key management engine 402 of server 140, the query indicating the account alias of the sender and including a request for a public key of the sender, an encrypted message key, and/or other information for decryption and/or verification of the encrypted message, and decrypting and/or verifying the encrypted message based on a response to the query).

In some circumstances, messaging application 500 may be unable to send a message using the first level of encryption. For example, in circumstances in which electronic device 102 is unable to communicate with server 140 (e.g., for encryption operations and/or for verification of the capability of the recipient device for receiving the messages with the first level of encryption) and/or the recipient device is unable to receive/decrypt encrypted messages, messaging application 500 may be unable to send a message using the first level of encryption. In circumstances in which messaging application 500 is unable to send a message using the first level of encryption, messaging application 500 may send the message using a second level of encryption (e.g., by sending an unencrypted SMS message via first network 106 and/or servers 120).

In one or more implementations, the second level of encryption may include one or more forms of encryption along the message path between a sending and receiving device, but not including end-to-end encryption (or including end-to-end encryption where one or more of the servers 120 possesses a key for decrypting the messages). For example, the second level of encryption may include an encryption that can be decrypted by a message transport server, such as one or more of the servers 120, such that the message transport server can perform spam detection on the message. After performing the spam detection, the message transport server may re-encrypt the message (e.g., using the same or different encryption), and may forward the encrypted message to the receiving device (assuming the message is not detected as spam). Thus, the second level of encryption may include some form of encryption and/or cryptography that allows the one or more servers 120 to perform some form of spam detection based on the content and/or metadata of the message.

In accordance with one or more implementations, even in some circumstances in which messaging application 500 is able to send a message using the first level of encryption and a recipient device is capable of receiving/decrypting a message using the first level of encryption, electronic device 102 may determine (e.g., using an eligibility engine 504 at the electronic device 102) that electronic device 102 is ineligible to send the message using the first level of encryption to the intended recipient device.

For example, messaging application 500 may include or be associated with an eligibility engine 504 that determines whether the electronic device 102 is eligible to send a message to a second device (e.g., electronic device 104) with a first strength of encryption that is higher than a second strength of encryption, based on (1) an identifier of electronic device 102 or (2) an identifier of the second device. In accordance with a determination, by eligibility engine 504 that the electronic device 102 is eligible to send the message to the second device with the first strength of encryption, messaging application 500 may send the message with the first strength of encryption (e.g., after encrypting the message using encryption engine 502 as described herein). In accordance with a determination that the electronic device 102 is not eligible to send the message to the second device with the first strength of encryption, messaging application 500 may send the message with the second strength of encryption (e.g., even in circumstances in which the recipient device is capable of receiving and/or decrypting messages with the first level of encryption). A message with the second strength of encryption may be, in one or more implementations, an unencrypted message, such as an SMS message, or an encrypted message for which the content is accessible by the one or more servers 120.

Eligibility engine 504 at electronic device 102 may determine whether electronic device 102 is eligible to send a message with the first level of encryption using data that is primarily and/or entirely stored at the electronic device 102. For example, eligibility engine 504 at electronic device 102 may determine whether electronic device 102 is eligible to send a message with the first level of encryption using an identifier of the electronic device 102 and/or an identifier of the second device (e.g., electronic device 104) and/or data stored in a message database 512. For example, message database 512, at electronic device 102, may include a message log 508 of messages that have been sent and/or received by electronic device 102 to and/or from various recipient devices (e.g., in a message history for the electronic device 102). As shown, message database 512 may also include a spam database 510 for spam messages that are received at electronic device 102. Messages received at electronic device 102 may be diverted to spam database 510 (e.g., rather than being delivered to a user by messaging application 500) if the message is flagged as spam (e.g. an SMS or MMS message flagged as spam by servers 120) and/or based on local settings at electronic device 102, such as based on whether electronic device 102 or another device of user 101 has previously sent a message to the device that sent the message (e.g., electronic device 102 may include settings that cause electronic messages with the first level of encryption that are received from a device for which message log 508 does not have a previously sent message to be diverted to spam database 510).

In one or more implementations, eligibility engine 504 may determine, based on the message history in message log 508, whether a message has previously been received, at electronic device 102, from the recipient device for which a new message is to be sent. If it is determined, by eligibility engine 504, that a message has previously been received, at electronic device 102, from the recipient device for which a new message is to be sent, the new message may be encrypted by encryption engine 502 (e.g., with the first level of encryption), and the encrypted message may be sent by messaging application 500. If it is determined, by eligibility engine 504, that no message has previously been received, at electronic device 102, from the recipient device for which a new message is to be sent, eligibility engine 504 may determine whether electronic device 102 is eligible to send the new message with the first level of encryption based on the identifier of the electronic device 102 and/or the identifier of the recipient device.

For example, in one or more implementations, the eligibility engine 504 may determine whether electronic device 102 is eligible to send the new message with the first level of encryption based on whether a portion (e.g., a country code, an area code, or a regional code) of a phone number of the electronic device 102 is the same or different from the corresponding portion (e.g., the country code, the area code, or the regional code) of a phone number of the recipient device. For example, in one or more implementations, the eligibility engine 504 may determine that electronic device 102 is eligible to send the new message with the first level of encryption if the country code of the phone number of the electronic device 102 is the same as the country code of the electronic device of the recipient device.

Figure 7:
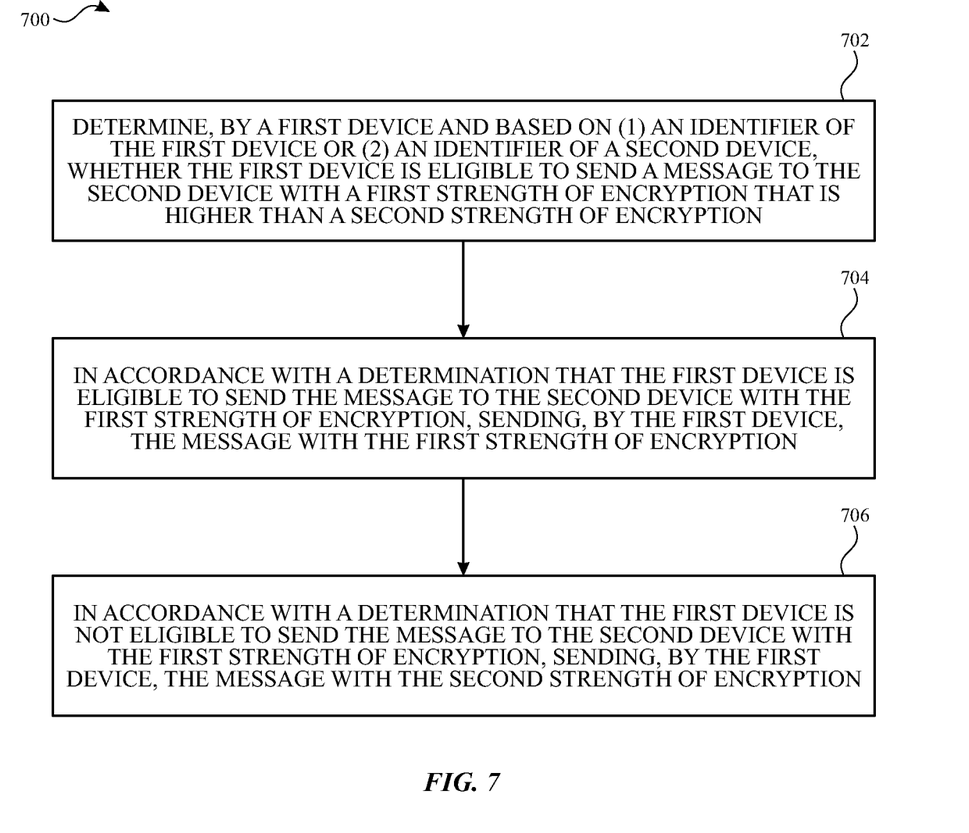
FIG. 7 illustrates a flow diagram of an example process for an sender verification for encrypted electronic messaging in accordance with one or more implementations.

Further details of determining whether electronic device 102 is eligible to send a message with the first level of encryption are discussed herein in connection, for example, with FIG. 7. Performing the eligibility determination at electronic device 102, using the data stored at electronic device 102 may allow determination of eligibility while preserving the privacy of the sender and/or the recipient (e.g., as the servers 140 do not receive or store any data from the electronic devices in connection with the determination operations). However, it should also be appreciated that, in one or more implementations, some or all of the eligibility determination operations described herein can be performed (e.g., using appropriate privacy preserving operations for both sender and recipient) by an eligibility engine 404 at servers 140.

As shown in FIG. 5, in one or more implementations, messaging application 500 may include, or be associated with, a trust engine 506 at electronic device 102. In one or more implementations, messaging application 500 may determine whether the first device is eligible based, in part, on a locally determined trustworthiness score for the electronic device (e.g., as generated by trust engine 506).

The trustworthiness score may be used in combination with, or in place of the determination by eligibility engine 504. For example, in various implementations, a trustworthiness score below a threshold may prevent sending of messages from the electronic device 102 with the first level of encryption, even in circumstances in which eligibility engine 504 determines that electronic device 102 is eligible based on the identifier(s) of the electronic device 102 and/or the recipient device (e.g., electronic device 104). In various implementations, a trustworthiness score above a threshold may cause messaging application 500 to allow sending of messages from the electronic device 102 with the first level of encryption, even in circumstances in which eligibility engine 504 determines that electronic device 102 is not eligible based on the identifier(s) of the electronic device 102 and/or the recipient device (e.g., electronic device 104). It should also be appreciated that, in one or more implementations, some or all of the trustworthiness determination operations described herein can be performed (e.g., using appropriate privacy preserving operations for both sender and recipient) by an optional trust engine 407 at servers 140.

In one or more implementations, the trustworthiness score of a sender device (e.g., electronic device 102) is determined locally at the sender device. In one or more implementations, the trustworthiness score of the sender device may be determined (e.g., by trust engine 506) using only locally stored data at the sender device. In one or more implementations, the trustworthiness score is determined based on a number of prior messages sent by the sender device (e.g., as determined using the message log 508 in message database 512). For example, the trustworthiness score of an electronic device may be inversely dependent on (e.g., inversely proportional to or inversely weighted by) the number of messages sent by that device, a number of messages sent per unit time (e.g., per day, per week, per hour, per minute) by that device, and/or a number of messages sent to unique recipient devices by that device.

In one or more implementations, the trustworthiness score may be determined based on a number of prior messages having similar content sent by the sender device. For example, the trustworthiness score of an electronic device may be inversely dependent on (e.g., inversely proportional to or inversely weighted by) the number of prior messages having similar (e.g., at least partially verbatim) content sent by the sender device. In one or more implementations, the trustworthiness score may be based on a location of the sender device. For example, the trustworthiness score may be higher, for the same device, when the device is located in one country than when the device is located in another country.

In one or more implementations, the trustworthiness score may be based on a comparison of the location of the sender device with location information associated with the identifier of the sender device. For example, the trustworthiness score may be lower for a particular device when the device is located in the country that corresponds to the country code 602 (see FIG. 6) for that device, than when the device is located in a country that is different from the country that corresponds to the country code 602 for that device. In one or more implementations, the trustworthiness score may be based on a location history of the sender device. For example, the trustworthiness score may be lower for devices purchased in a first country and assigned a phone number having a country code 602 associated with that first country, and then then moved (e.g., permanently or semi-permanently) to location(s) outside of that first country.

Figure 6:
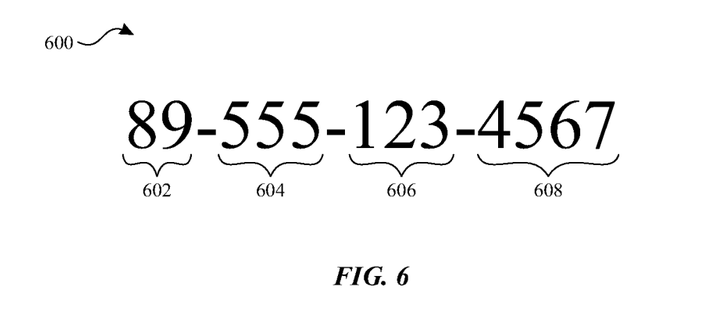
FIG. 6 illustrates an example identifier that can be associated with an electronic device in accordance with one or more implementations.

FIG. 6 illustrates an identifier of an electronic device having portions that can be used (e.g., by an eligibility engine 504 at an electronic device) to determine whether a sender device is eligible to send a message with a first level or encryption that is higher than a second level or encryption. In the example of FIG. 6, the identifier of the electronic device (e.g., electronic device 102) is a phone number 600 (e.g., a telephone number) that includes a country code 602 that identifies a country associated with the device, an area code 604 that identifies an area within the country identified by the country code, a regional code 606 that identifies a region within the area identified by the area code, and a device-specific code 608.

FIG. 7 illustrates a flow diagram of an example process 700 for sender verification for encrypted electronic messaging, in accordance with one or more implementations. For explanatory purposes, the process 700 is primarily described herein with reference to the electronic devices 102 and 104, and the servers 120 and 140 of FIG. 1. However, the process 700 is not limited to the electronic devices 102 and 104, and the servers 120 and 140 of FIG. 1, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a first device (e.g., electronic device 102 of FIG. 1) determines, based on (1) an identifier of the first device or (2) an identifier of a second device (e.g., an identifier corresponding to the second device), whether the first device is eligible to send a message to the second device with a first strength of encryption that is higher than a second strength of encryption. In some examples, the first device is a sender device. In some examples, the first device is a smart television, a laptop or a mobile device, such as a smart phone or a smart watch. In some examples, the second device is a recipient device. In some examples, the message includes content. In some examples, the content is output by the second device (e.g., in a message stream view of a messaging application, displayed on a display of the second device) after the second device receives and/or decrypts the message. In some examples, the message is a text message, a visual message (e.g., a message that includes an image), an audio message, or a video message. The identity of the first device may include at least a portion of a phone number associated with the first device. For example, the portion of the phone number may include at least one of a country code 602, an area code 604, or a regional code 606 of the phone number.

At block 704, in accordance with a determination (e.g., at the first device) that the first device is eligible to send the message to the second device with the first strength of encryption, the first device may send the message with the first strength of encryption. In some examples, the message is sent to the second device. In some examples, the message is sent to a server (e.g., servers 140 of service provider 150) and the server sends the message to the second device. The determination may be based on both the identifier of the first device and the identifier of the second device. In some examples, the determination may be based on whether the identifier of the first device is the same as the identifier of the second device. For example, the first device may determine that the first device is eligible to send the message with the first strength of encryption if a portion of the identifier of the first device is the same as a corresponding portion of the identifier of the second device (e.g., if the country code of the phone number of the first device is the same as the country code of the phone number of the second device). In this example, the first device may determine that the first device is not eligible to send the message with the first strength of encryption if the portion of the identifier of the first device is different from the corresponding portion of the identifier of the second device (e.g., if the country code of the phone number of the first device is different from the country code of the phone number of the second device).

At block 706, in accordance with a determination (e.g., at the first device) that the first device is not eligible to send the message to the second device with the first strength of encryption, the first device may send the message with the second strength of encryption. Sending the message with the second strength of encryption may include sending a short-message service (SMS) message via an SMS server (e.g., one or more of servers 120). In some examples, the SMS message may be an unencrypted message (e.g., the level of encryption may be zero). Sending the message with the first strength of encryption may include sending an encrypted message via a server (e.g., one or more of servers 140) other than the SMS server. In some examples, the second strength of encryption allows the SMS server to access the content of the message. As described herein, the SMS server may determine whether to flag the message sent with the second strength of encryption as spam, by accessing the content of the message (e.g., which is accessible due to the relatively lower second strength of encryption). In cases in which the SMS server flags the message as spam, the SMS server may decline to forward the message to the recipient device, or the message with the spam flag may be forwarded to the recipient device. In some examples, the recipient device may direct a message that is received with a spam flag to a spam database at the recipient device.

Sending the message with the first strength of encryption may incur a cost to the sender that is less than a cost of sending the message with the second strength of encryption. For example, the cost to the sender of sending the message with the first strength of encryption may be zero (e.g., messages sent with the first level of encryption, such as via servers 140, may be free messages). For example, the cost to the sender of sending the message with the second strength of encryption may be a non-zero cost such as a per-message cost or a data-based cost charged by a provider of the first network 106. The non-zero cost of sending messages with the second strength of encryption when a sender device is determined to be ineligible for sending the message with the first strength of encryption may serve as a deterrent to sending spam messages with the sender device.

The determination by the first device may also be based on whether the second device has sent a previous message to the first device. The determination of whether the recipient has sent a previous message to the sender may be based on message data stored at the first device. For example, the first device may determine whether a previous message from the second device is stored in a message log, such as message log 508 of message database 512 of FIG. 5, at the first device. For example, after sending the message with the second strength of encryption with the first device, the first device may receive a response message from the recipient device (e.g., at the sender device). The first device may send a subsequent message with the first strength of encryption based on receiving the response message (e.g., after receiving the response message).

In some cases, the message history at a sender device and/or a recipient device may be modified by the user of that device. In some examples, prior messages that are stored at the device can be deleted from the message database (e.g., message database 512) at that device. Deletion, at the sender device, of the message history with the recipient device may cause the next message from the sender device to the recipient device to be sent with the second strength of encryption instead of the first strength of encryption.

Deletion, at the recipient device, of the message history with the sender device may not affect the encryption level of a next message from the sender device, as the determination of eligibility to send the next message with the first level of encryption may be determined at the sender device using data that is local to the sender device. However, deletion of a message history with the sender device, at the recipient device, may cause the next message (which can be sent with the first strength of encryption due to the undeleted message history at the sender device, in this example) to be sent to a spam database (e.g., a junk folder) at the recipient device (e.g., based on a determination at the recipient device that the sender device has not previously sent a message to the recipient device). In this scenario, a sender may be provided with an alert that the message was sent to the spam database at the recipient. If the original message was sent using a phone handle as a messaging alias, the alert at the sender device may include a recommendation to resend the message using SMS. If the original message was sent using an email handle as a messaging alias, then the sender may be provided a link to support documentation to understand options (e.g., contacting the recipient through an alternative means).

In some examples, the determination by the first device (e.g., the sender device) is also based, in part, on a locally determined trustworthiness score for the first device (e.g., by a trust engine at the first device such as trust engine 506, as described in detail above in connection with FIG. 5.

As described above, one aspect of the present technology is the gathering and use of data available from specific and legitimate sources for identifying a potential group member for a group of a user. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for sender verification for encrypted electronic messaging. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sender verification for encrypted electronic messaging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
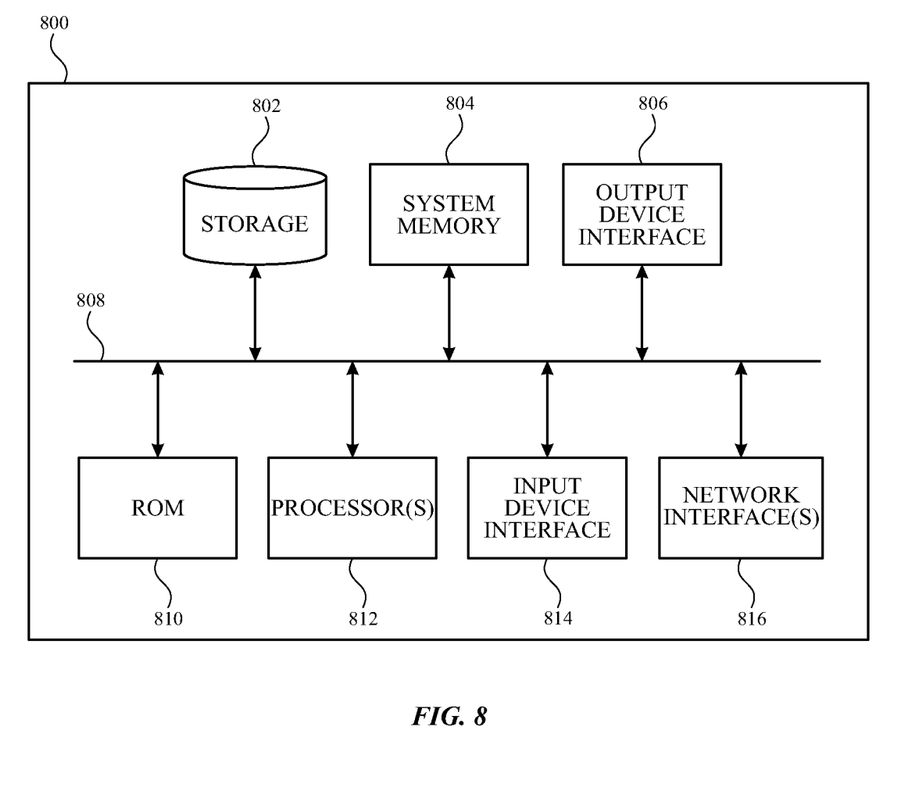
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102 or 104, the servers 120 and/or the servers 140 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the servers 120 and/or the servers 140 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with aspects of the disclosure, a method is provided that includes determining, by a first device and based on (1) an identifier of the first device or (2) an identifier of a second device, whether the first device is eligible to send a message to the second device with a first strength of encryption that is higher than a second strength of encryption; in accordance with a determination that the first device is eligible to send the message to the second device with the first strength of encryption, sending, by the first device, the message with the first strength of encryption; and in accordance with a determination that the first device is not eligible to send the message to the second device with the first strength of encryption, sending, by the first device, the message with the second strength of encryption.

In accordance with aspects of the disclosure, a non-transitory machine-readable medium is provided storing instructions that, when executed by one or more processors, cause the one or more processors to perform operations that include determining, by a first device and based on (1) an identifier of the first device or (2) an identifier of a second device, whether the first device is eligible to send a message to the second device with a first strength of encryption that is higher than a second strength of encryption; in accordance with a determination that the first device is eligible to send the message to the second device with the first strength of encryption, sending, by the first device, the message with the first strength of encryption; and in accordance with a determination that the first device is not eligible to send the message to the second device with the first strength of encryption, sending, by the first device, the message with the second strength of encryption.

In accordance with aspects of the disclosure, an electronic device is provided that includes memory, and one or more processors, where the one or more processors are configured to determine, based on (1) an identifier of the electronic device or (2) an identifier of a second device, whether the electronic device is eligible to send a message to the second device with a first strength of encryption that is higher than a second strength of encryption; in accordance with a determination that the electronic device is eligible to send the message to the second device with the first strength of encryption, send the message with the first strength of encryption; and in accordance with a determination that the electronic device is not eligible to send the message to the second device with the first strength of encryption, send the message with the second strength of encryption.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by a first device and based on (1) an identifier of the first device or (2) an identifier of a second device, whether the first device is eligible to send a message to the second device with a first strength of encryption that is higher than a second strength of encryption;

in accordance with a determination that the first device is eligible to send the message to the second device with the first strength of encryption, sending, by the first device, the message with the first strength of encryption via a first network; and in accordance with a determination that the first device is not eligible to send the message to the second device with the first strength of encryption, sending, by the first device, the message with the second strength of encryption via a second network that differs from the first network.

2. The method of claim 1, wherein determining whether the first device is eligible comprises determining whether the first device is eligible based on both the identifier of the first device and the identifier of the second device.

3. The method of claim 1, wherein determining whether the first device is eligible further comprises determining whether the first device is eligible based on whether the second device has sent a previous message to the first device.

4. The method of claim 3, wherein determining whether the first device is eligible based on whether the second device has sent the previous message to the first device is based on message data stored at the first device.

5. The method of claim 1, wherein the identifier of the first device comprises at least a portion of a phone number associated with the first device.

6. The method of claim 5, wherein the portion of the phone number includes at least one of a country code, an area code, or a regional code.

7. The method of claim 1, wherein sending the message with the second strength of encryption comprises sending a short-message service (SMS) message via an SMS server, and wherein sending the message with the first strength of encryption comprises sending an encrypted message via a server other than the SMS server.

8. The method of claim 1, further comprising, after sending the message with the second strength of encryption by the first device:

receiving a message from the second device at the first device; and sending a subsequent message, by the first device to the second device, with the first strength of encryption based on receiving the message.

9. The method of claim 1, wherein determining whether the first device is eligible further comprises determining whether the first device is eligible based on a locally determined trustworthiness score for the first device.

10. A non-transitory machine-readable medium storing instructions that, when executed by one or more processors, cause the one or more processors to perform operations that include:

determining, by a first device and based on (1) an identifier of the first device or (2) an identifier of a second device, whether the first device is eligible to send a message to the second device with a first strength of encryption that is higher than a second strength of encryption;

in accordance with a determination that the first device is eligible to send the message to the second device with the first strength of encryption, sending, by the first device, the message with the first strength of encryption via a first network; and in accordance with a determination that the first device is not eligible to send the message to the second device with the first strength of encryption, sending, by the first device, the message with the second strength of encryption via a second network that is distinct from the first network.

11. The non-transitory machine-readable medium of claim 10, wherein determining whether the first device is eligible comprises determining whether the first device is eligible based on both the identifier of the first device and the identifier of the second device.

12. The non-transitory machine-readable medium of claim 10, wherein determining whether the first device is eligible further comprises determining whether the first device is eligible based on whether the second device has sent a previous message to the first device.

13. The non-transitory machine-readable medium of claim 12, wherein determining whether the first device is eligible based on whether the second device has sent the previous message to the first device is based on message data stored at the first device.

14. The non-transitory machine-readable medium of claim 10, wherein the identifier of the first device comprises at least a portion of a phone number associated with the first device.

15. The non-transitory machine-readable medium of claim 14, wherein the portion of the phone number includes at least one of a country code, an area code, or a regional code.

16. An electronic device, comprising:

memory; and one or more processors, wherein the one or more processors are configured to:

determine, based on (1) an identifier of the electronic device or (2) an identifier of a second device, whether the electronic device is eligible to send a message to the second device with a first strength of encryption that is higher than a second strength of encryption;

in accordance with a determination that the electronic device is eligible to send the message to the second device with the first strength of encryption, send the message with the first strength of encryption via a first network; and in accordance with a determination that the electronic device is not eligible to send the message to the second device with the first strength of encryption, send the message with the second strength of encryption via a second network that differs from the first network.

17. The electronic device of claim 16, wherein the one or more processors are configured to send the message with the second strength of encryption by sending a short-message service (SMS) message via an SMS server, and to send the message with the first strength of encryption by sending an encrypted message via a server other than the SMS server.

18. The electronic device of claim 16, wherein the one or more processors are further configured to, after sending the message with the second strength of encryption:

receive a message from the second device; and send a subsequent message, to the second device, with the first strength of encryption based on receiving the message from the second device.

19. The electronic device of claim 16, wherein the one or more processors are further configured to determine whether the electronic device is eligible based on a locally determined trustworthiness score for the electronic device.

20. The electronic device of claim 16, wherein the identifier of the electronic device comprises at least a portion of a phone number associated with the electronic device.

* * * * *